(12) United States Patent
Asanuma et al.

(10) Patent No.: US 11,329,573 B2
(45) Date of Patent: May 10, 2022

(54) POWER CONVERTER AND POWER CONVERSION SYSTEM

(71) Applicant: Panasonic Intellectual Property Management Co., Ltd., Osaka (JP)

(72) Inventors: Kenichi Asanuma, Osaka (JP); Makoto Ozone, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 180 days.

(21) Appl. No.: 16/636,586

(22) PCT Filed: Jul. 26, 2018

(86) PCT No.: PCT/JP2018/028106
§ 371 (c)(1),
(2) Date: Feb. 4, 2020

(87) PCT Pub. No.: WO2019/026764
PCT Pub. Date: Feb. 7, 2019

(65) Prior Publication Data
US 2021/0159809 A1 May 27, 2021

(30) Foreign Application Priority Data
Aug. 4, 2017 (JP) .............................. JP2017-151846

(51) Int. Cl.
*H02M 7/5395* (2006.01)
*H02J 3/32* (2006.01)
(Continued)

(52) U.S. Cl.
CPC ............ *H02M 7/5395* (2013.01); *H02J 3/32* (2013.01); *H02J 3/38* (2013.01); *H02M 1/00* (2013.01);
(Continued)

(58) Field of Classification Search
CPC .... H02J 3/32; H02J 3/38; H02M 1/00; H02M 7/53871–5395; H02M 1/007; H02M 1/0009
See application file for complete search history.

(56) References Cited

U.S. PATENT DOCUMENTS

2008/0284252 A1* 11/2008 Jones ..................... H02J 3/40
307/82
2010/0156186 A1* 6/2010 Kim ..................... H01M 16/003
307/72
(Continued)

FOREIGN PATENT DOCUMENTS

JP   H02-231962 A   9/1990
JP   H11-069841 A   3/1999
(Continued)

OTHER PUBLICATIONS

International Search Report issued in International Patent Application No. PCT/JP2018/028106, dated Sep. 11, 2018, with English translation.

*Primary Examiner* — Yusef A Ahmed
(74) *Attorney, Agent, or Firm* — McDermott Will & Emery LLP

(57) ABSTRACT

A power conversion system according to the present disclosure includes a plurality of power converters for performing power conversion on AC power and is connected to a power grid of multi-phase power that is a combination of multiple alternating current sources with mutually different phases. Each of the plurality of power converters includes a power converter circuit, a setting unit, and a control circuit. The power converter circuit performs power conversion between either DC power or AC power and AC power supplied from any of the multiple alternating current sources. The setting unit selects one of the multiple alternating current sources as a target of the power conversion to be performed by the (Continued)

power converter circuit. The control circuit controls operation of the power converter circuit in accordance with selection made by the setting unit.

14 Claims, 14 Drawing Sheets

(51) Int. Cl.
*H02J 3/38* (2006.01)
*H02M 1/00* (2006.01)
*H02M 7/5387* (2007.01)

(52) U.S. Cl.
CPC ........ *H02M 7/53873* (2013.01); *H02M 1/007* (2021.05)

(56) References Cited

U.S. PATENT DOCUMENTS

| | | | |
|---|---|---|---|
| 2011/0080131 A1* | 4/2011 | Shimada | H02P 27/04 318/503 |
| 2011/0134672 A1* | 6/2011 | Sato | H02M 5/4585 363/126 |
| 2011/0148360 A1* | 6/2011 | Lee | H02J 9/062 320/134 |
| 2011/0157934 A1* | 6/2011 | Clemo | H02J 1/102 363/71 |
| 2011/0169471 A1* | 7/2011 | Nagasawa | H01L 24/37 323/283 |
| 2012/0147639 A1* | 6/2012 | Mao | H02M 7/493 363/98 |
| 2012/0175964 A1* | 7/2012 | Yoscovich | H02J 3/00 307/82 |
| 2013/0009700 A1* | 1/2013 | Deboy | H02J 3/381 327/581 |
| 2013/0021009 A1* | 1/2013 | Waltman | H02M 3/156 323/271 |
| 2013/0181530 A1* | 7/2013 | Deboy | H02J 3/40 307/82 |
| 2013/0181531 A1* | 7/2013 | Deboy | H02J 3/385 307/82 |
| 2013/0187473 A1* | 7/2013 | Deboy | H02M 7/49 307/82 |
| 2013/0271056 A1* | 10/2013 | Bunte | H02P 27/06 318/503 |
| 2014/0015326 A1* | 1/2014 | Eberhardt | H02M 7/53873 307/82 |
| 2014/0175888 A1* | 6/2014 | Deboy | H02M 7/49 307/82 |
| 2015/0001932 A1* | 1/2015 | Inoue | H02J 3/46 307/24 |
| 2015/0015072 A1* | 1/2015 | Deboy | H02M 7/48 307/52 |
| 2015/0115722 A1* | 4/2015 | Fawzy | H02J 3/18 307/82 |
| 2015/0236603 A1* | 8/2015 | Jimichi | H02M 1/14 363/37 |
| 2015/0349387 A1* | 12/2015 | Inaba | H02J 7/0013 700/297 |
| 2016/0211771 A1* | 7/2016 | Ichihara | H02M 7/5395 |
| 2016/0329716 A1* | 11/2016 | Inoue | H02J 3/46 |
| 2017/0012550 A1* | 1/2017 | Abe | H02M 7/5387 |
| 2017/0047742 A1* | 2/2017 | Narla | H02J 7/007 |
| 2017/0104423 A1* | 4/2017 | Wu | H02M 7/53875 |
| 2017/0207693 A1* | 7/2017 | Geng | H02J 3/381 |
| 2019/0199100 A1* | 6/2019 | Kadota | H02M 3/33592 |
| 2019/0229646 A1* | 7/2019 | Liu | H02J 3/38 |
| 2019/0393801 A1* | 12/2019 | Agirman | H02P 27/08 |
| 2020/0144930 A1* | 5/2020 | Inomata | H02M 1/38 |
| 2020/0259337 A1* | 8/2020 | DeCock | G05B 17/02 |
| 2020/0287494 A1* | 9/2020 | Ishizuka | H02M 7/5395 |
| 2021/0021224 A1* | 1/2021 | Niimura | H02P 27/08 |
| 2021/0249971 A1* | 8/2021 | Inomata | H02M 7/493 |
| 2021/0288504 A1* | 9/2021 | Horio | H02J 3/466 |
| 2021/0288579 A1* | 9/2021 | Luo | H02M 1/0845 |

FOREIGN PATENT DOCUMENTS

| | | |
|---|---|---|
| JP | 2012-165611 A | 8/2012 |
| JP | 2015-095926 A | 5/2015 |

* cited by examiner

000# POWER CONVERTER AND POWER CONVERSION SYSTEM

CROSS-REFERENCE OF RELATED APPLICATIONS

This application is the U.S. National Phase under 35 U.S.C. § 371 of International Patent Application No. PCT/JP2018/028106, filed on Jul. 26, 2018, which in turn claims the benefit of Japanese Application No. 2017-151846, filed on Aug. 4, 2017, the entire disclosures of which Applications are incorporated by reference herein.

TECHNICAL FIELD

The present disclosure generally relates to a power converter and a power conversion system, and more particularly relates to a power converter and power conversion system for use in multi-phase AC power conversion.

BACKGROUND ART

A power converter has been known which performs power conversion between a DC power supply and a three-phase AC power grid (see, for example, Patent Literature 1). This power converter includes a three-phase inverter and three single-phase inverters, each provided for an associated one of the three phases, and outputs the sum of AC-side voltages generated by the three-phase inverter and the respective single-phase inverters to an AC-side circuit section.

The power converter of Patent Literature 1 is configured as a combination of the three-phase inverter and the single-phase inverters for the three phases. If a failure occurs in any of the three phases, then the three-phase inverter should be replaced in its entirety. Thus, the power converter of that type is not easy to maintain.

CITATION LIST

Patent Literature

Patent Literature 1: JP 2015-95926 A

SUMMARY OF INVENTION

It is therefore an object of the present disclosure to provide a power converter and power conversion system with the ability to improve installability.

A power converter according to an aspect of the present disclosure is designed for use as one of a plurality of power converters that form parts of a power conversion system. Each of the plurality of power converters performs power conversion on AC power. The power conversion system is connected to a power grid of multi-phase power that is a combination of multiple alternating current sources with mutually different phases. Each of the plurality of power converters includes a power converter circuit, a setting unit, and a control circuit. The power converter circuit performs power conversion between either DC power or AC power and AC power supplied from any of the multiple alternating current sources. The setting unit selects one of the multiple alternating current sources as a target of the power conversion to be performed by the power converter circuit. The control circuit controls operation of the power converter circuit in accordance with selection made by the setting unit.

A power conversion system according to another aspect of the present disclosure includes: a plurality of the power converters; and a signal bus electrically connected to each of the plurality of power converters. The signal bus includes a plurality of signal lines respectively associated with multiple types of information to be shared by the plurality of power converters.

DESCRIPTION OF EMBODIMENTS

Embodiments (1) Configuration

Figure 1:
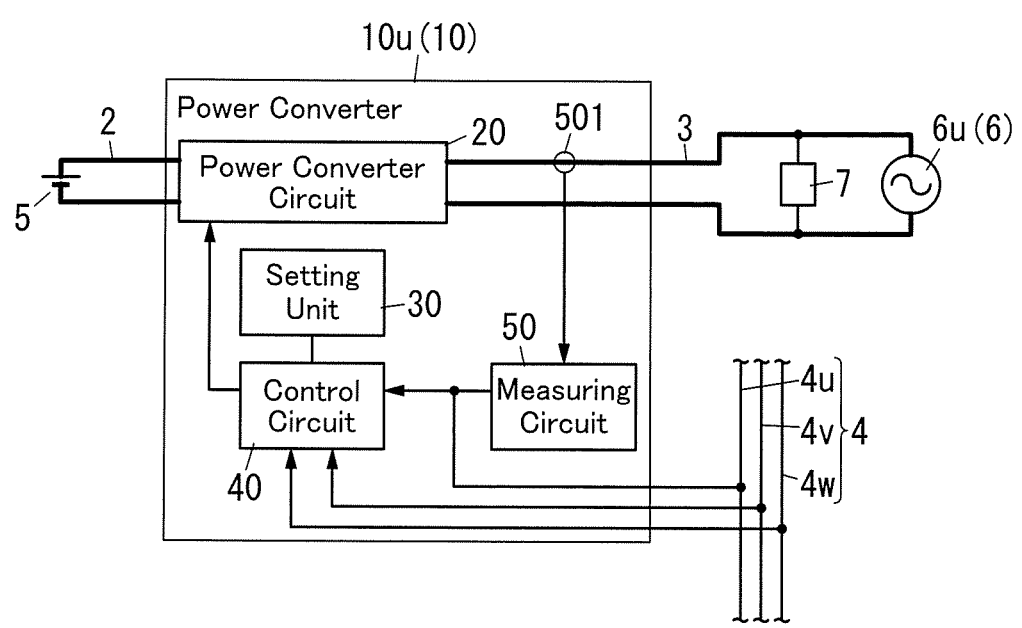
FIG. 1 is a circuit diagram illustrating a single phase part of a power conversion system according to an exemplary embodiment of the present disclosure.

A power converter 10 according to an exemplary embodiment includes a power converter circuit 20, a setting unit 30, a control circuit 40, and a measuring circuit 50, as shown in FIG. 1.

Figure 2:
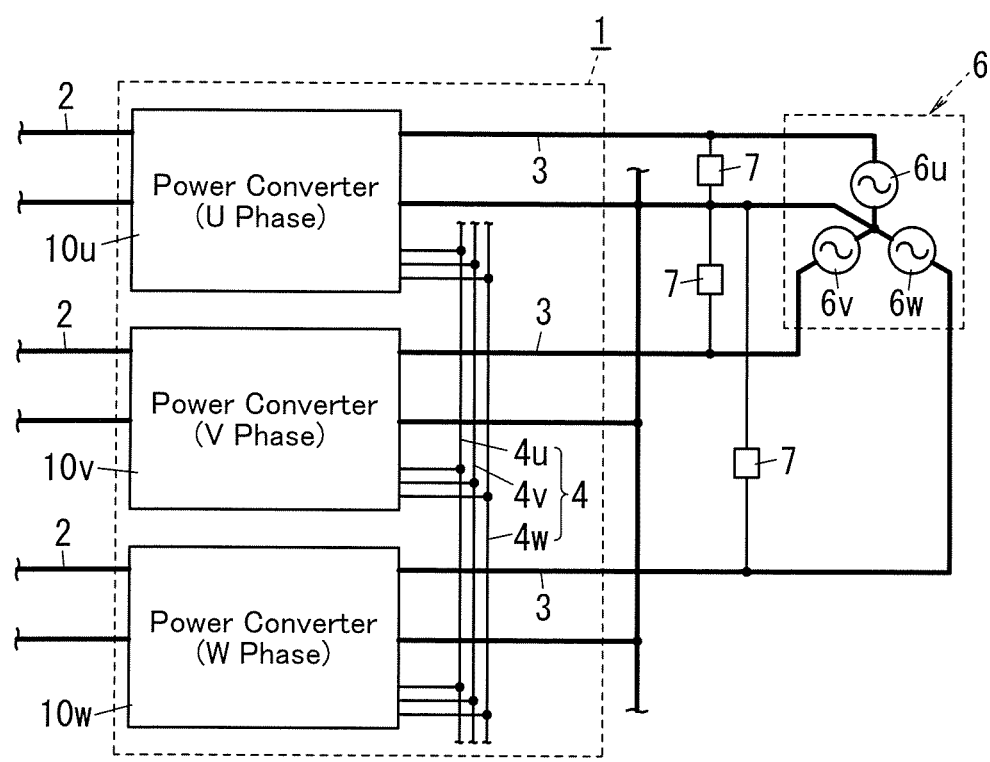
FIG. 2 is a circuit diagram illustrating the power conversion system according to the exemplary embodiment of the present disclosure.

The power converter 10 according to this embodiment may be used in the power conversion system 1 shown in FIG. 2. The power conversion system 1 is connected to a three-phase AC power grid 6. The three-phase AC power grid is a combination of three-phase (U, V, and W phase) alternating current sources $6u$, $6v$, and $6w$, of which the phases are different from each other by 120 degrees. The power conversion system 1 includes three power converters 10u, 10v, and 10w. The power converters 10u, 10v, and 10w perform power conversion on the U, V, and W phase alternating current sources 6u, 6v, and 6w, respectively. The power conversion system 1 supplies power to a load 7 in conjunction with the power grid 6.

The power converters 10u, 10v, and 10w are each connected to a signal bus 4 including three signal lines 4u, 4v, and 4w, and share information with each other through the signal bus 4. As used herein, the "information" refers to information to be used to let the power converters 10u, 10v, and 10w operate in conjunction with each other. Examples of pieces of the information include electrical characteristic values (such as input or output current values and voltage values) about the alternating current sources 6u, 6v, and 6w of the respective phases, an error signal (suspend instruction), and a clock signal.

The power converter 10 according to this embodiment is used as one of the power converters 10u, 10v, and 10w in the power conversion system 1. The power converter 10 shown in FIG. 1 is a U-phase power converter 10u. The V- and W-phase power converters 10v and 10w also have the same configuration as the U-phase power converter 10u. Thus, in the following description, the U-phase power converter 10 will be described with reference to FIG. 1, and description of the V- and W-phase power converters 10v and 10w will be omitted herein. Also, in the following description, when there is no need to distinguish the power converters 10u, 10v, and 10w from each other, those power converters 10u, 10v, and 10w will be hereinafter collectively referred to as "power converters 10."

The power converter circuit 20 is electrically connected to a DC power supply 5 via an electric wire 2, and also electrically connected to the U-phase alternating current source 6u via another electric wire 3. The power converter circuit 20 performs power conversion between the DC power supplied from the DC power supply 5 and the AC power supplied from the alternating current source 6u. The power converter circuit 20 is configured to convert power bidirectionally, i.e., convert the DC power supplied from the DC power supply 5 into AC power and also convert the AC power supplied from the alternating current source 6u into DC power. The DC power supply 5 may be implemented as, for example, a storage battery which may be charged and discharged. The power converter circuit 20 may convert the DC power discharged from the storage battery into AC power and output the AC power to an AC-side circuit section. Alternatively, the power converter circuit 20 may also convert the AC power supplied from the alternating current source 6u into DC power and charge the storage battery with the DC power. The power converter circuit 20 includes a bidirectional inverter circuit with the ability to perform the operation of converting DC power into AC power and the operation of converting AC power into DC power. The inverter circuit may be implemented as, for example, a switching power supply. The inverter circuit carries out power conversion by performing pulse width modulation (PWM) control on a switching element in response to a PWM signal supplied from the control circuit 40.

The setting unit 30 may be implemented as a dual in-line package (DIP) switch, for example. The setting unit 30 may be used to select one of the plurality of alternating current sources 6u, 6v, and 6w as a target alternating current source (e.g., the U-phase alternating current source 6u in the example illustrated in FIG. 1) to be subjected to the power conversion by the power converter circuit 20.

The measuring circuit 50 measures, as a value representing an electrical characteristic of the alternating current source 6u as a target of conversion by the power converter circuit 20, an input current or output current of the power converter circuit 20. The measuring circuit 50 measures the amount of an alternating current flowing between the power converter circuit 20 and the alternating current source 6u by using a transformer 501 such as a current transformer or a hall IC. In this case, if the storage battery as a DC power supply 5 has discharged electricity, the current value measured by the measuring circuit 50 is a current value of the output current. On the other hand, if the storage battery as the DC power supply 5 is to going to be charged, then the current value measured by the measuring circuit 50 is a current value of the input current. The measuring circuit 50 outputs the measured value of the alternating current to the control circuit 40 and the signal line 4u for the U-phase alternating current source 6u.

In this case, alternating current measured values are input from the V- and W-phase power converters 10v and 10w to the V- and W-phase signal lines 4v and 4w, respectively. The signal bus 4 including the three-phase signal lines 4u, 4v, and 4w is electrically connected to each of the plurality of power converters 10u, 10v, and 10w. Thus, the information output from the U-, V-, and W-phase power converters 10u, 10v, and 10w to the signal lines 4u, 4v, and 4w (i.e., the value measured by the measuring circuit 50) is shared by the power converters 10u, 10v, and 10w of the respective phases.

The control circuit 40 is implemented as, for example, a microcomputer including a central processing unit (CPU) and a memory. In other words, the control circuit 40 is implemented as a computer including a CPU and a memory. The computer performs the function of the control circuit 40 by making the CPU execute a program stored in the memory. In this embodiment, the program is stored in advance in the memory of the control circuit 40. However, this is only an example and should not be construed as limiting. The program may also be downloaded via a telecommunications line such as the Internet or distributed after having been stored in a storage medium such as a memory card.

The control circuit 40 receives an alternating current measured value for the U-phase alternating current source 6u from the measuring circuit 50, and also receives alternating current measured values for the V- and W-phase alternating current sources 6v and 6w via the signal lines 4v and 4w, respectively. Thus, the control circuit 40 receives alternating current measured values for the alternating current sources 6u, 6v, and 6w from the respective measuring circuits 50 for the U-, V-, and W-phases.

The control circuit 40 controls the operation of the power converter circuit 20 in accordance with the selection made by the setting unit 30. When the setting unit 30 selects the U-phase alternating current source 6u as a target of power conversion by the power converter circuit 20, the control circuit 40 controls the power converter circuit 20 in conjunction with the power converters 10v and 10w for the alternating current sources 6v and 6w of the other phases. That is to say, the control circuit 40 controls, based on the U-phase alternating current measured value provided by the measuring circuit 50 and the V- and W-phase alternating current measured values provided through the signal lines 4v and 4w, the power converter circuit 20 such that the U-phase alternating current comes to have a desired value. Thus, the control circuit 40 is able to make the U-phase power converter 10u operate in conjunction with the power converters 10v and 10w of the other phases (V- and W-phases), thus reducing a dispersion in output between the respective phases and thereby improving the quality of power. In addition, reducing the dispersion in output between the phases eliminates the need to provide any AC filter of a large size on the output end of the power converter circuit 20, thus contributing to size reduction of the power converter 10.

Also, when the V-phase AC voltage has become lower than a predetermined lower limit value due to an inconvenience in any other phase, e.g., the V-phase alternating current source 6v, the control circuit 40 suspends the operation of the power converter circuit 20. At this time, in the W-phase power converter 10w, the control circuit 40 also suspends the operation of the power converter circuit 20. Thus, the U- and W-phase power converter circuits 20 suspend their operation. Therefore, when the output voltage of the power converter circuit 20 becomes lower than the lower limit value in one of the three phases of the three-phase AC power supply system, the operation of the power converter circuit 20 is also suspended in the other phases of the three-phase AC power supply system, thus reducing the chances of the power conversion system 1 operating in an imbalanced state.

As can be seen from the foregoing description, the power converter 10 (10u, 10v, 10w) performs power conversion on the AC power supplied from any of the three-phase alternating current sources 6u, 6v, and 6w with mutually different phases. The control circuit 40 is able to determine, by acquiring information about the selection made by the setting unit 30, which of the three-phase alternating current sources 6u, 6v, and 6w is the target of power conversion to be performed by the power converter circuit 20, and control the power converter circuit 20 according to the phase of the alternating current source as the target of power conversion. Thus, when any inconvenience occurs in any of the three-phase power converters 10u, 10v, and 10w, only the power converter 10 with the inconvenience needs to be replaced. This makes the power conversion system 1 much easier to maintain, compared to replacing the power conversion system 1 in its entirety. This improves the installability (work efficiency) and productivity of the power conversion system 1 and contributes to cost reduction as well. Besides, simply changing the settings of the setting unit 30 allows the power converter 10 to be used as a power converter for any of the multi-phase alternating current sources, thus making the power converter 10 much handier as well.

(2) Variations

Note that the embodiment described above is only an exemplary one of various embodiments of the present disclosure and should not be construed as limiting. Rather, the embodiment described above may be readily modified in various manners, depending on a design choice or any other factor, without departing from the scope of the present disclosure.

Next, variations of the embodiment described above will be enumerated one after another. Note that any of the variations to be described below may be combined as appropriate with the configuration of the exemplary embodiment described above.

(2.1) First Variation

Figure 3:
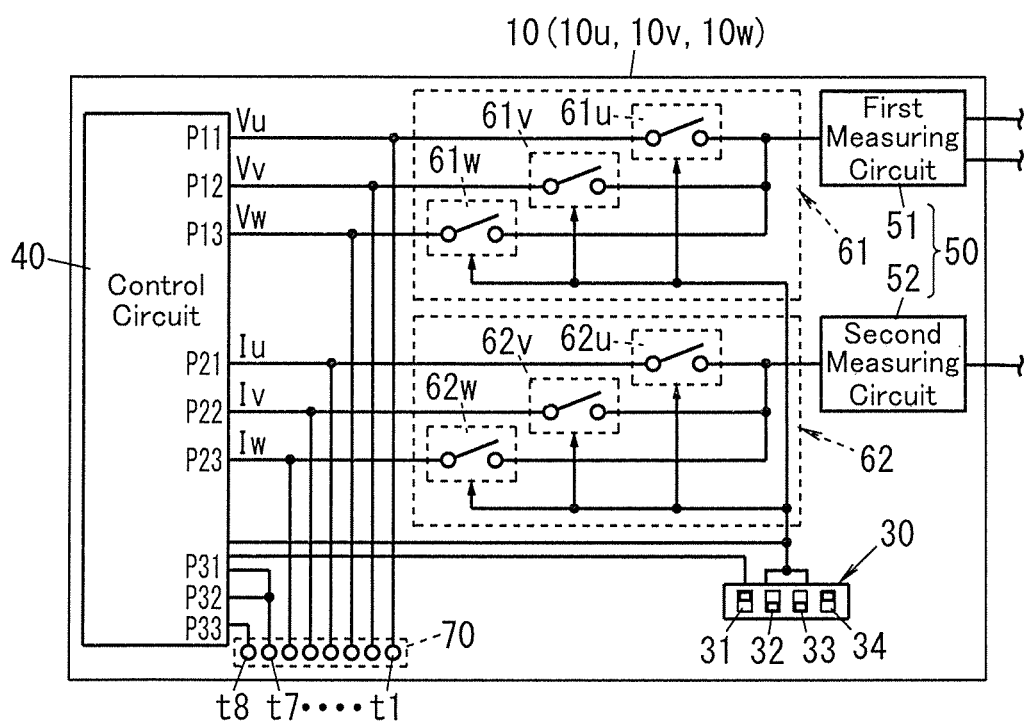
FIG. 3 is a circuit diagram illustrating a power converter according to a first variation of the exemplary embodiment of the present disclosure.
Figure 4:
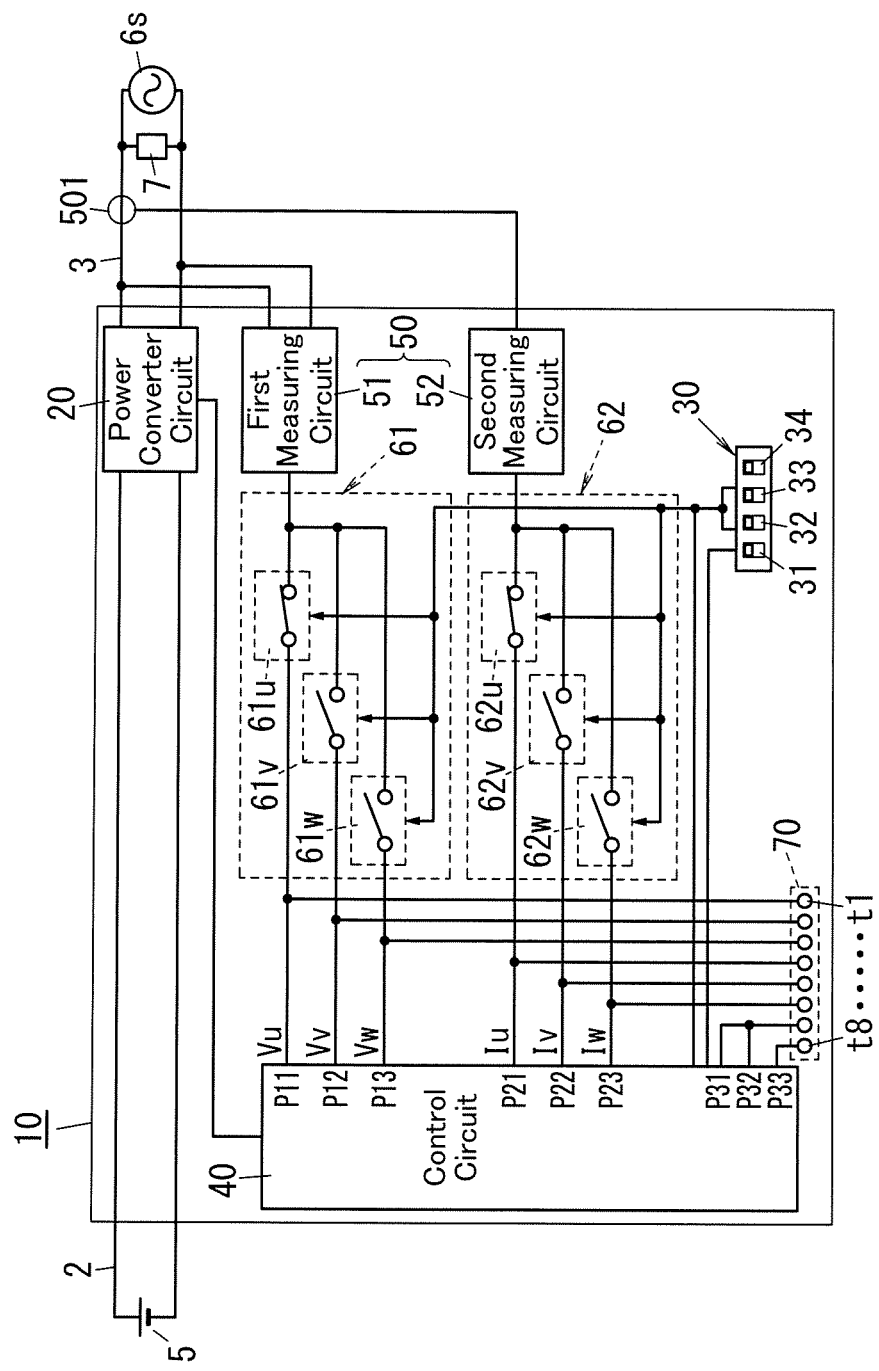
FIG. 4 is a circuit diagram illustrating a single-phase AC power conversion system that uses the power converter according to the first variation.
Figure 5:
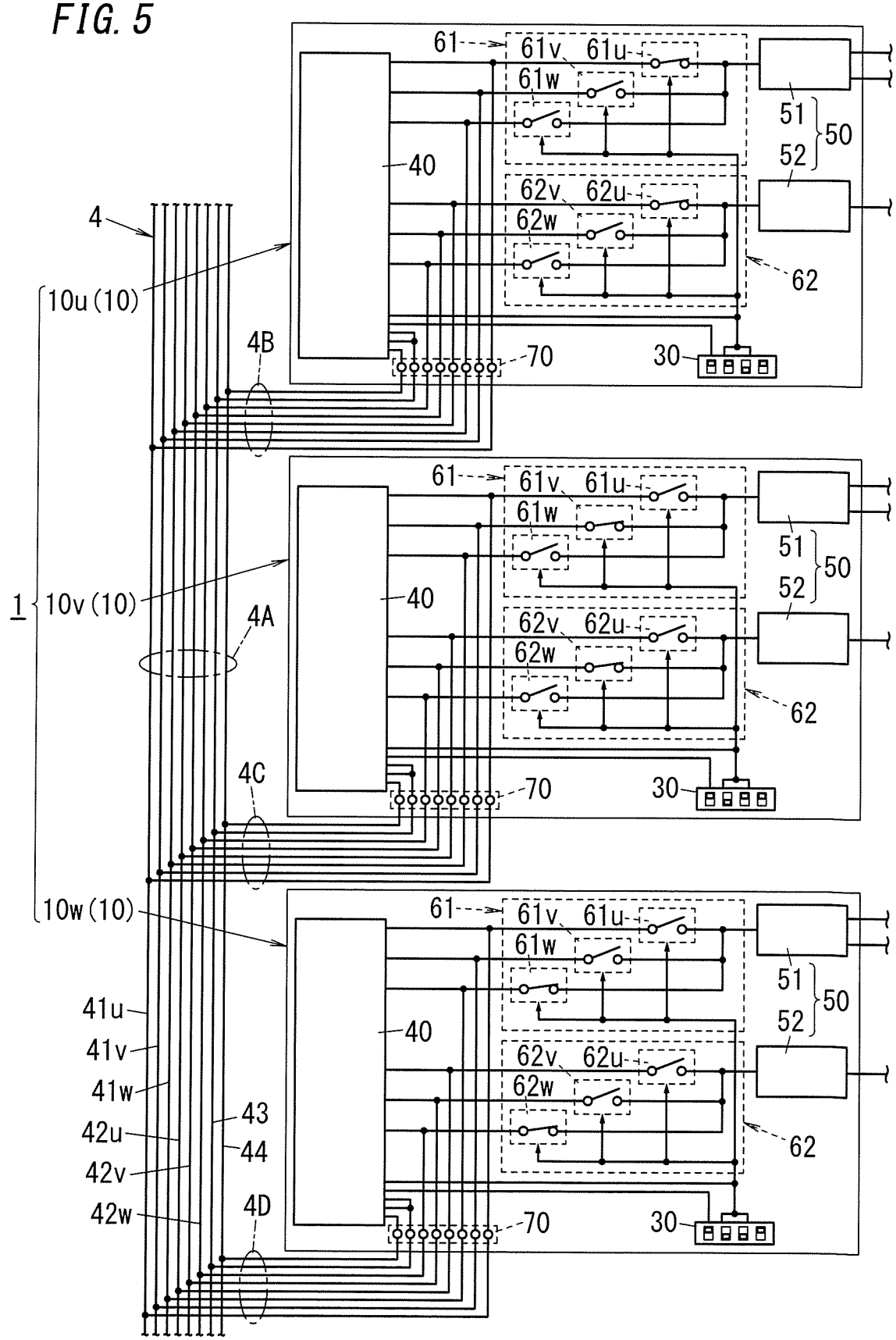
FIG. 5 is a circuit diagram illustrating a three-phase AC power conversion system that uses the power converters according to the first variation.

In the power converter 10 (10u, 10v, 10w) described above, the measuring circuit 50 measures the alternating current. However, this is only an example and should not be construed as limiting. The measuring circuit 50 does not have to measure the alternating current. The power converter 10 according to a first variation includes, as the measuring circuit 50, a first measuring circuit 51 for measuring the output voltage of the power converter circuit 20 and a second measuring circuit 52 for measured the alternating current as shown in FIGS. 3-5. Note that in FIGS. 3 and 5, illustration of non-essential constituent elements, other than the essential ones to be described in the following description of the first variation, is omitted as appropriate.

The setting unit 30 may be implemented as a four-bit DIP switch with four switches 31-34, for example. For instance, the switch 31 may be used to switch the type of connection of the power grid 6 from star connection to delta connection, and vice versa. Meanwhile, the switches 32 and 33 may be used to select any of a single-phase alternating current source 6s (see FIG. 4), the U-phase alternating current source 6u, the V-phase alternating current source 6v, or the W-phase alternating current source 6w as a target of power conversion.

The control circuit 40 includes input ports P11, P12, and P13 to receive U-, V-, and W-phase AC voltage measured values Vu, Vv, and Vw, respectively, and input ports P21, P22, and P23 to receive U-, V-, and W-phase alternating current measured values Iu, Iv, and Iw, respectively.

The control circuit 40 further includes an output port P31 to output an error signal as the suspend instruction, an input port P32 to receive the error signal (suspend instruction), and an input/output port P33 to receive or output a clock signal. The control circuit 40 further includes another input port to receive information about the selection made by the setting unit 30.

The input ports P11-P13, P21-P23, and P32, the output port P31, and the input/output port P33 of the control circuit 40 are electrically connected to terminals t1-t8 of a connector 70. Specifically, the input port P32 and the output port P31 are both electrically connected to the terminal t7 of the connector 70. Also, the terminals t1-t8 of the connector 70 are respectively electrically connected to the signal lines 41u-41w, 42u-42w, 43, and 44 of the signal bus 4 (see FIG. 5). In this variation, in each of the three-phase power converters 10u, 10v, and 10w, the terminals t1-t8 of the connector 70 are arranged at fixed positions and have the same arrangement.

In addition, the power converter 10 according to the first variation further includes a switching circuit (including a first switching circuit 61 and a second switching circuit 62) for outputting the value measured by the measuring circuit 50 (including the first measuring circuit 51 and the second measuring circuit 52) to one of the signal lines, associated with the alternating current source as the target of power conversion, of the signal bus 4.

The first switching circuit 61 includes switches 61u, 61v, and 61w connected between the output terminal of the first measuring circuit 51 and the input ports P11, P12, and P13, respectively. Turning these switches 61u, 61v, and 61w ON and OFF in accordance with the selection made by the setting unit 30 allows the output terminal of the first measuring circuit 51 to be connected to any of the input ports P11-P13. Likewise, the second switching circuit 62 includes switches 62u, 62v, and 62w connected between the output terminal of the second measuring circuit 52 and the input ports P21, P22, and P23, respectively. Turning these switches 62u, 62v, and 62w ON and OFF in accordance with the selection made by the setting unit 30 allows the output terminal of the second measuring circuit 52 to be connected to any of the input ports P21-P23.

For example, when either the U-phase alternating current source 6u or the single-phase alternating current source 6s is selected by the setting unit 30 as a target of power conversion, the switches 61u and 62u turn ON and the switches 61v, 61w, 62v, and 62w turn OFF. Thus, the value measured by the first measuring circuit 51 is supplied to the input port P11 and the value measured by the second measuring circuit 52 is supplied to the input port P21.

Meanwhile, when the V-phase alternating current source 6v is selected by the setting unit 30 as a target of power conversion, the switches 61v and 62v turn ON and the switches 61u, 61w, 62u, and 62w turn OFF. Thus, the value measured by the first measuring circuit 51 is supplied to the input port P12 and the value measured by the second measuring circuit 52 is supplied to the input port P22.

Furthermore, when the W-phase alternating current source 6w is selected by the setting unit 30 as a target of power conversion, the switches 61w and 62w turn ON and the switches 61u, 61v, 62u, and 62v turn OFF. Thus, the value measured by the first measuring circuit 51 is supplied to the input port P13 and the value measured by the second measuring circuit 52 is supplied to the input port P23.

This power converter 10 is used in any power supply selected from the group consisting of the single-phase alternating current source and the three-phase alternating current sources 6u, 6v, and 6w. That is to say, the power converter 10 may be used as a single-phase power converter in a power conversion system for the single-phase alternating current source 6s, and may also be used as a power converter for any of the respective phases in the three-phase AC power conversion system 1.

FIG. 4 illustrates an example in which the power converter 10 is applied to a power conversion system for the single-phase alternating current source 6s. In this case, in accordance with the selection made by the setting unit 30, only the switches 61u and 62u turn ON, the value measured by the first measuring circuit 51 is supplied to the input port P11 of the control circuit 40, and the value measured by the second measuring circuit 52 is supplied to the input port P21 of the control circuit 40. The control circuit 40 controls, based on the measured values Vu and Iu supplied from the first and second measuring circuits 51 and 52 to the input ports P11 and P21, respectively, the power converter circuit 20 such that the measured values Vu and Iu become equal to predetermined settings. This allows the power converter 10 to convert the DC power discharged from a storage battery as the DC power supply 5 into AC power and supply the power to the load in conjunction with the single-phase alternating current source 6s. In addition, the power converter 10 is also able to convert the AC power supplied from the single-phase alternating current source 6s into DC power and charge the storage battery as the DC power supply 5 with the DC power.

On the other hand, FIG. 5 illustrates an example in which the three power converters 10u, 10v, and 10w are applied to the three-phase AC power conversion system 1.

In this case, in the U-phase power converter 10u, in accordance with the selection made by the setting unit 30, only the switches 61u and 62u turn ON, the value measured by the first measuring circuit 51 is supplied to the input port P11 of the control circuit 40, and the value measured by the second measuring circuit 52 is supplied to the input port P21 of the control circuit 40. In addition, the values measured by the V- and W-phase power converters 10v and 10w are also supplied through the signal bus 4 to the control circuit 40 of the power converter 10u. This allows the control circuit 40 of the power converter 10u to control, based on the alternating current and AC voltage measured values for the alternating current source 6u as the target of power conversion and the alternating current and AC voltage measured values for the alternating current sources 6v, 6w of the other phases, the operation of the power converter circuit 20.

In the V-phase power converter 10v, in accordance with the selection made by the setting unit 30, only the switches 61v and 62v turn ON, the value measured by the first measuring circuit 51 is supplied to the input port P12 of the control circuit 40, and the value measured by the second measuring circuit 52 is supplied to the input port P22 of the control circuit 40. In addition, the values measured by the U- and W-phase power converters 10u and 10w are also input through the signal bus 4 to the control circuit 40. This allows the control circuit 40 of the power converter 10v to control, based on the alternating current and AC voltage measured values for the alternating current source 6v as the target of power conversion and the alternating current and AC voltage measured values for the alternating current sources 6u and 6w of the other phases, the operation of the power converter circuit 20.

In the W-phase power converter 10w, in accordance with the selection made by the setting unit 30, only the switches 61w and 62w turn ON, the value measured by the first measuring circuit 51 is supplied to the input port P13 of the control circuit 40, and the value measured by the second measuring circuit 52 is supplied to the input port P23 of the control circuit 40. In addition, the values measured by the U- and V-phase power converters 10u and 10v are also supplied through the signal bus 4 to the control circuit 40. This allows the control circuit 40 of the power converter 10w to control, based on the alternating current and AC voltage measured values for the alternating current source 6w as the target of power conversion and the alternating current and AC voltage measured values for the alternating current sources 6u and 6v of the other phases, the operation of the power converter circuit 20.

This allows the control circuit 40 of the power converter 10u, 10v, or 10w of each phase to share information with the power converters 10 of the other phases through the signal bus 4 and make the power converter circuit 20 operate in conjunction with the power converters 10 of the other phases.

In FIG. 5, the signal bus 4 consists of trunk lines 4A and branch lines 4B, 4C, and 4D connecting the trunk lines 4A to the power converters 10u, 10v, and 10w of the respective phases. Thus, the respective connectors 70 of the power converters 10u, 10v, and 10w of the three phases are electrically connected to the trunk lines 4A via the branch lines 4B, 4C, and 4D, respectively. Although the connectors 70 of the power converters 10u, 10v, and 10w are connected to the trunk lines 4A via the branch lines 4B, 4C, and 4D in the example illustrated in FIG. 5, the pattern of connection between the connectors 70 and the signal bus 4 may be changed as appropriate.

Figure 6:
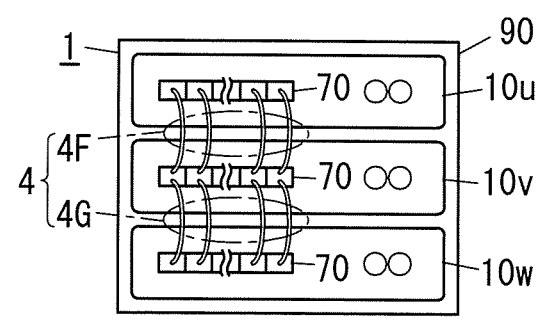
FIG. 6 is a front view illustrating a state where the power converter according to the first variation is housed in a housing rack.

FIG. 6 illustrates a state where the power converters 10u, 10v, and 10w of the three phases are housed in a housing rack 90 (housing). The housing rack may have the shape of a box with a front opening, for example. In the housing rack 90, housed are the power converters 10u, 10v, and 10w of the three phases, which are stacked one on top of another. Each of the power converters 10u, 10v, and 10w has the connector 70 arranged on the front surface of its body. The connector 70 of the power converter 10v arranged at the middle and the connector 70 of the power converter 10u arranged at the top are electrically connected together via harness 4F. The connector 70 of the power converter 10v arranged at the middle and the connector 70 of the power converter 10w arranged at the bottom are electrically connected together via harness 4G. That is to say, these harnesses 4F and 4G are connected in common to the connector 70 of the power converter 10v. In the exemplary connection shown in FIG. 6, these harnesses 4F and 4G form the signal bus 4.

Alternatively, the signal bus 4 may be installed in the housing rack 90, and may have female connectors, to which the connectors 70 are inserted, at appropriate positions. Thus, inserting the power converters 10u, 10v, and 10w through the opening of the housing rack 90 allows the connectors 70 of the power converters 10u, 10v, and 10w to be connected to the female connectors provided for the signal bus 4. This makes the terminals t1-t8 of the connectors 70 electrically connected to the signal lines 41u-41w, 42u-42w, 43, and 44 of the signal bus 4, thus facilitating the work of electrically connecting the connectors 70 to the signal bus 4.

(2.2) Second Variation

Figure 7:
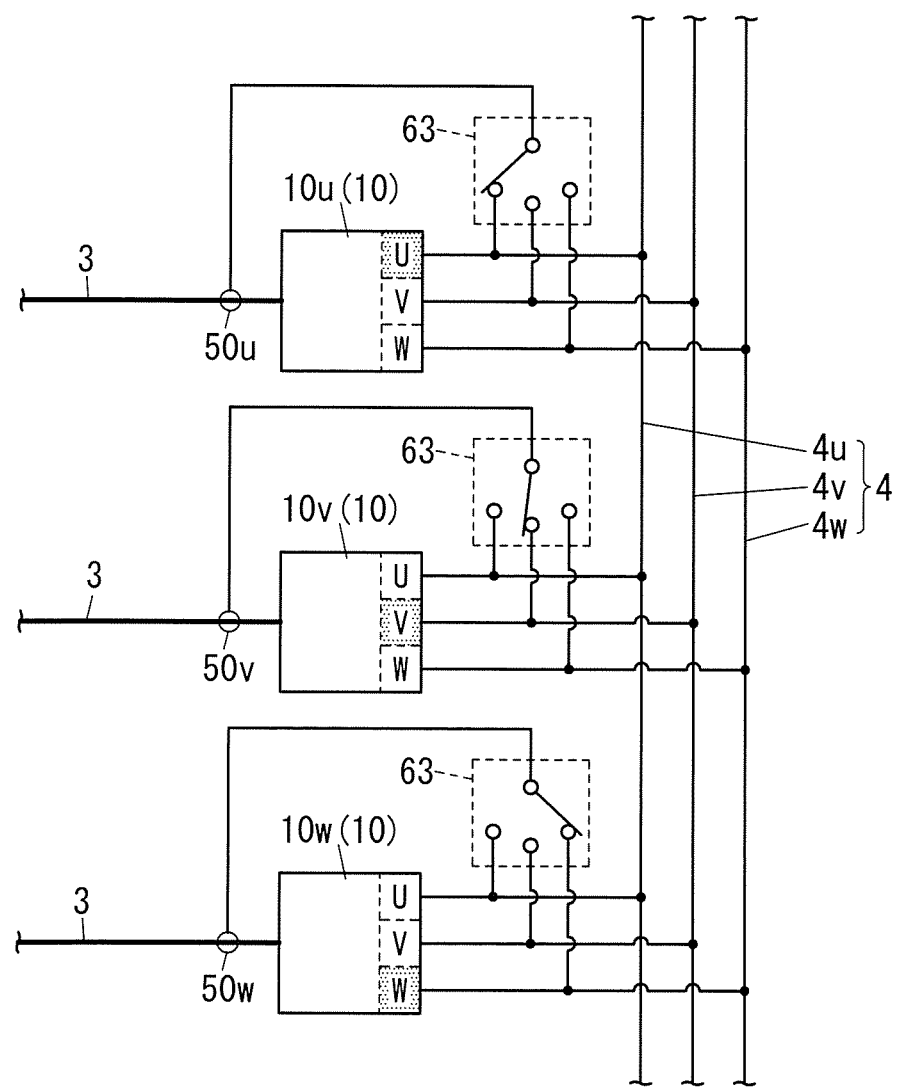
FIG. 7 is a circuit diagram illustrating a three-phase AC power conversion system that uses power converters according to a second variation.

In the exemplary embodiment and first variation described above, the power converter 10u, 10v, or 10w of each phase includes the measuring circuit 50. On the other hand, in the second variation, measuring circuits 50u, 50v, and 50w are respectively provided outside of the power converters 10u, 10v, and 10w as shown in FIG. 7. In the following description, any constituent element of this second variation, having the same function as a counterpart of the exemplary embodiment described above, will be designated by the same reference numeral as that counterpart's, and description thereof will be omitted herein.

Each measuring circuit 50u, 50v, or 50w measures the alternating current flowing through the alternating current source 6u, 6v, or 6w using a transformer such as a current transformer or a hall IC.

The output terminal of each of these measuring circuits 50u, 50v, and 50w is electrically connected to the U-, V- or W-phase signal lines 4u, 4v, and 4w via a switching circuit 63. Specifically, the measuring circuit 50u outputs a measured value to the signal line 4u via the switching circuit 63. The measuring circuit 50v outputs a measured value to the signal line 4v via the switching circuit 63. The measuring circuit 50w outputs a measured value to the signal line 4w via the switching circuit 63.

In this manner, the values measured by the measuring circuits 50u, 50v, and 50w of the respective phases are supplied to, and shared by, each of the power converters 10u, 10v, and 10w via the signal lines 4u, 4v, and 4w of the signal bus 4. This allows, in each of the power converters 10u, 10v, and 10w, the control circuit 40 to control the operation of the power converter circuit 20 based on the values measured by the measuring circuits 50u, 50v, and 50w and supplied through the signal bus 4.

(2.3) Third Variation

A power conversion system 1 according to a third variation is a modified example of the power conversion system 1 according to the first variation. In the power conversion system 1 according to the third variation, out of the power converters 10u, 10v, and 10w of the three phases, the power converter 10v, for example, may serve as a master device, and the power converters 10u and 10w may serve as slave devices. In this variation, the setting unit 30 may be used, in each of the power converters 10u, 10v, and 10w, to determine whether the power converter 10 of its own should serve as a master device or a slave device. The power conversion system 1 according to the third variation has the same configuration as the power conversion system 1 according to the first variation. Thus, in the following description, any constituent element of this third variation, having the same function as a counterpart of the first variation described above, will be designated by the same reference numeral as that counterpart's, and description thereof will be omitted herein.

The control circuit 40 of the power converter 10v, serving as a master device, determines, based on the value measured by the measuring circuit 50 and the values measured by the U- and W-phase power converters 10u and 10w and supplied through the signal bus 4, whether or not any error has occurred. On deciding that an error should have occurred in any of the U, V or W phase, the control circuit 40 outputs an error signal (suspend instruction) through the output port P31, thereby suspending the operation of the power converter circuit 20. The error signal output from the control circuit 40 of the power converter 10v is supplied to the input port P32 of the control circuit 40 of each of the power converters 10u and 10w through the signal bus 4. On receiving the error signal at the input port P32, the control circuit 40 of each of the power converters 10u and 10w suspends the operation of the power converter circuit 20. In this manner, the error signal (suspend instruction) output from the power converter 10v serving as a master device may be used to suspend the operation of the power converters 10u and 10w serving as slave devices. This allows the three power converters 10u, 10v, and 10w to operate in conjunction with each other.

In this case, if the distances between the master device and the slave devices were too long, then it would take a lot of time to transmit the signal, thus possibly causing a delay before the slave devices resume the operation suspended. In the power conversion system 1 according to the third variation, out of the three power converters 10u, 10v, and 10w, the power converter 10v arranged at the middle serves as a master device, and the other power converters 10u and 10w serve as slave devices. This allows not only the distances from the master device to the slave devices but also the delay before the slave devices resume the operation suspended to be shortened, compared to a situation where either of the power converters 10u and 10w arranged at both ends serves as a master device.

(2.4) Fourth Variation

Figure 8:
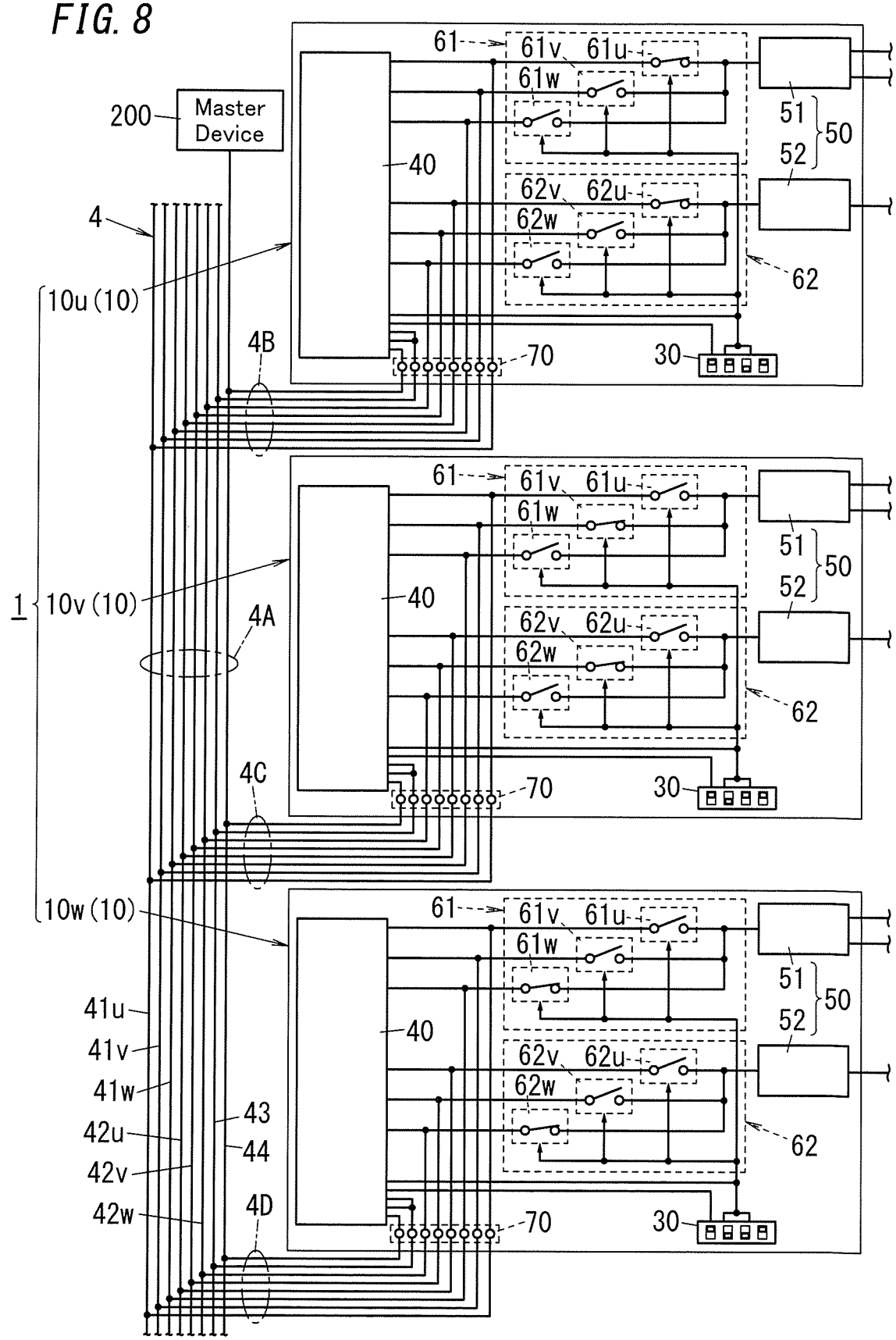
FIG. 8 is a circuit diagram illustrating a power conversion system according to a fourth variation of the exemplary embodiment of the present disclosure.

In the power conversion system 1 according to the third variation, one of the power converters 10u, 10v, and 10w of the three phases serves as a master device, and the other power converters serves as slave devices. In contrast, according to a fourth variation, the power converters 10u, 10v, and 10w all serve as slave devices, and a master device 200 is provided separately from the power converters 10u, 10v, and 10w as shown in FIG. 8.

The master device 200 is connected to the respective control circuits 40 of the power converters 10u, 10v, and 10w through the signal lines 44 of the signal bus 4. The master device 200 outputs a clock signal to the signal lines 44 so that the clock signal is supplied to the respective control circuits 40 of the power converters 10u, 10v, and 10w. The respective control circuits 40 of the power converters 10u, 10v, and 10w operate responsive to the same clock signal supplied from the master device 200, thus reducing the chances of causing a time lag in the operation between the power converters 10u, 10v, and 10w.

The information provided by the master device 200 for the respective control circuits 40 of the power converters 10u, 10v, and 10w via the signal bus 4 does not have to be the clock signal but may also be a control instruction such as a suspend instruction (error signal). The master device's 200 transmitting the control instruction to the power converters 10u, 10v, and 10w via the signal bus 4 allows the power converters 10u, 10v, and 10w to operate in conjunction with each other (e.g., suspend their operation).

(2.5) Fifth Variation

Figure 9:
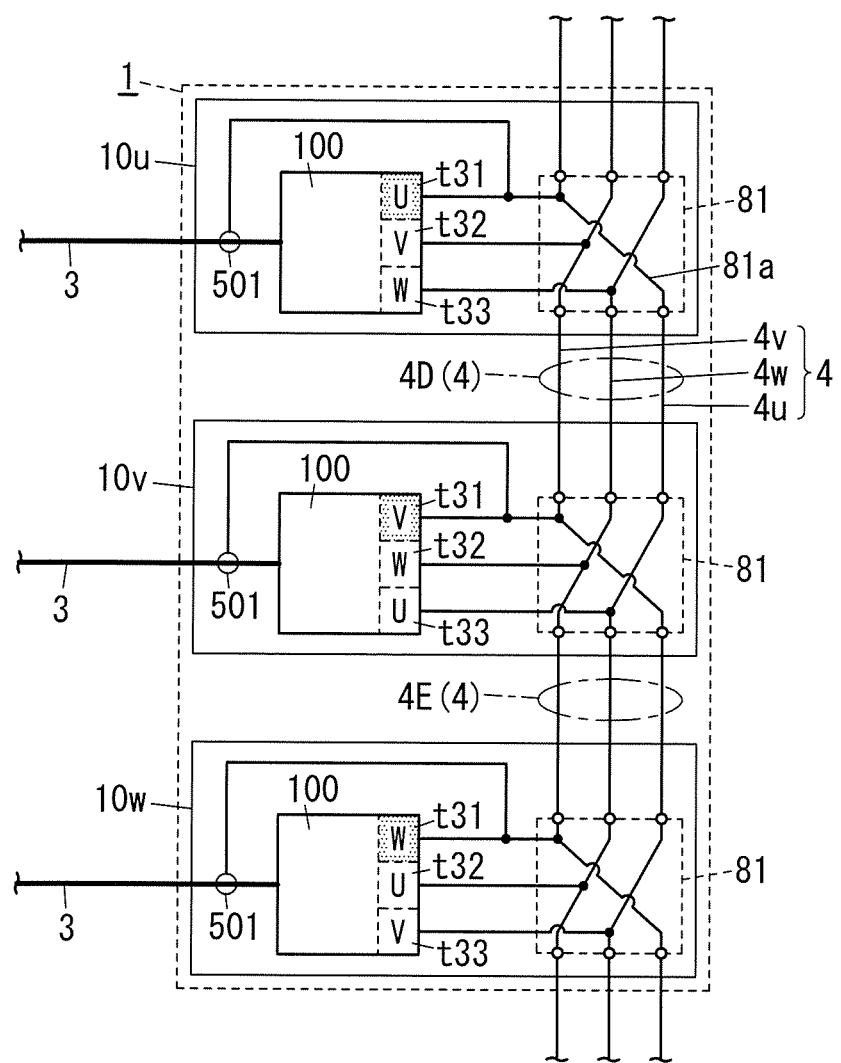
FIG. 9 is a schematic circuit diagram illustrating a power converter according to a fifth variation of the exemplary embodiment of the present disclosure.

FIG. 9 is a schematic circuit diagram of the power converters 10 according to a fifth variation. The power converters 10 (10u, 10v, 10w) according to the fifth variation each include a connection circuit 81, which is a major difference from the power converters 10 according to the exemplary embodiment. In the other respects, however, the power converters 10 according to the fifth variation have the same configuration as the power converters 10 according to the exemplary embodiment. Thus, in the following description, any constituent element of this fifth variation, having the same function as a counterpart of the exemplary embodiment described above, will be designated by the same reference numeral as that counterpart's, and description thereof will be omitted herein.

Each of the power converters 10u, 10v, and 10w of the respective phases includes a circuit board 100 on which circuits such as the power converter circuit 20 are integrated together. On the circuit board 100, provided are connection terminals t31, t32, and t33 to be connected to the signal lines 4u, 4v, and 4w of the signal bus 4. To the connection terminals t31, t32, and t33, multiple types of information is provided. Examples of the information provided include the values measured by the respective measuring circuits 50 of the power converters 10u, 10v, and 10w of the respective phases. In accordance with the information provided to the connection terminals t31, t32, and t33 (such as the values measured by the measuring circuits 50), the control circuits 40 of the power converters 10u, 10v, and 10w of the respective phases control the output of their power converter circuit 20.

In this variation, the connection terminals t31, t32, and t33 are provided at the same fixed positions in each of the power converters 10u, 10v, and 10w. However, the signal lines 4u, 4v, and 4w are connected in three different patterns to the three sets of connection terminals t31, t32, and t33 in the power converters 10u, 10v, and 10w. In other words, the power converters 10u, 10v, and 10w have respectively different wiring patterns at the three sets of connection terminals t31, t32, and t33.

Specifically, in the power converter 10u, the connection terminals t31 is associated with the U-phase alternating current source 6u as a target of power conversion, the connection terminal t32 is associated with the V-phase alternating current source 6v, and the connection terminal t33 is associated with the W-phase alternating current source 6w.

In the power converter 10v, the connection terminals t31 is associated with the V-phase alternating current source 6v as a target of power conversion, the connection terminal t32 is associated with the W-phase alternating current source 6w, and the connection terminal t33 is associated with the U-phase alternating current source 6u.

In the power converter 10w, the connection terminals t31 is associated with the W-phase alternating current source 6w as a target of power conversion, the connection terminal t32 is associated with the U-phase alternating current source 6u, and the connection terminal t33 is associated with the V-phase alternating current source 6v.

As can be seen, in each of the power converters 10u, 10v, and 10w, not only the arrangement pattern of the phases of currents associated with the connection terminals t31, t32, and t33 (i.e., the types of information) but also the wiring pattern of signal lines 4u, 4v, and 4w to which the connection terminals t31, t32, and t33 are respectively connected are different from any other one of the power converters 10u, 10v, and 10w.

Thus, each of the power converters 10u, 10v, and 10w includes the connection circuit 81. The connection circuit 81 includes electrically conductive paths 81a for connecting each of the connection terminals t31, t32, and t33 to an associated one of the plurality of signal lines 4u, 4v, and 4w. Therefore, in the power converters 10u, 10v, and 10w of the three phases, the three connection terminals associated with the same type of information are electrically connected together via the connection circuits 81, among the plurality of connection terminals t31, t32, and t33. This allows the power converters 10u, 10v, and 10w of the three phases to share information via the connection circuits 81 and also allows each control circuit 40 to control its own power converter circuit 20 in accordance with the information shared.

In this fifth variation, in each of the power converters 10u, 10v, and 10w, the signal line to be connected to each of the connection terminals t31, t32, and t33 is selected by the connection circuit 81, and therefore, the power converters 10u, 10v, and 10w just need to be attached to their predetermined positions. That is to say, there is no need for the installer to rotate the phase of any signal line (i.e., change the arrangement of the signal lines), thus facilitating the connection work. In other words, the three electrically conductive paths 81a of the connection circuit 81 are configured to rotate the phases of the three signal lines 4u, 4v, and 4w of the U, V, and W phases that form the signal bus 4 (i.e., rotate the phases such that each of the three signal lines 4u, 4v, and 4w of the U, V, and W phases is arranged to be shifted by one phase from each of the two other signal lines). Thus, the connection circuit's 81 rotating the phases of the three signal lines 4u, 4v, and 4w of the U, V, and W phases allows signal lines of associated alternating current phases to be connected to the connection terminals t31, t32, and t33 in each of the power converters 10u, 10v, and 10w. That is to say, the connection circuit 81 rotates the phases (changes the arrangement pattern) of the signal lines 4u, 4v, and 4w such that signal lines of associated alternating current phases are connected to the connection terminals t31, t32, and t33 in each of the power converters 10u, 10v, and 10w. This allows the connection terminals t31, t32, and t33, to which the signal lines 4u, 4v, and 4w need to be connected, to be shuffled in each of the power converters 10u, 10v, and 10w.

Next, a specific configuration for the power converter 10 according to the fifth variation will be described with reference to FIGS. 10-12.

Figure 10:
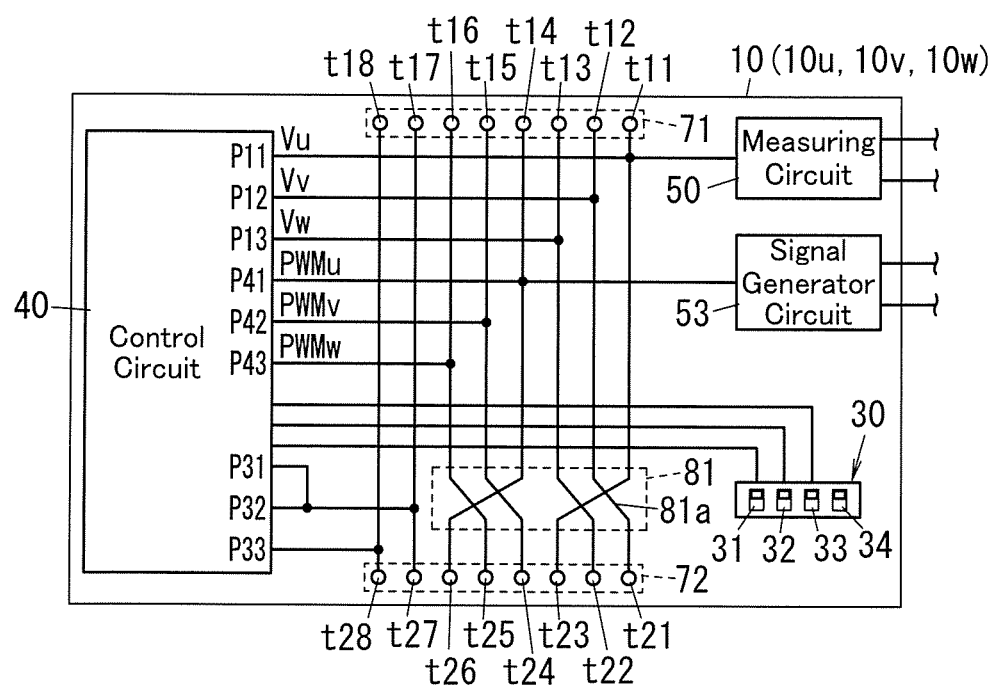
FIG. 10 is a circuit diagram of the power converter according to the fifth variation.
Figure 11:
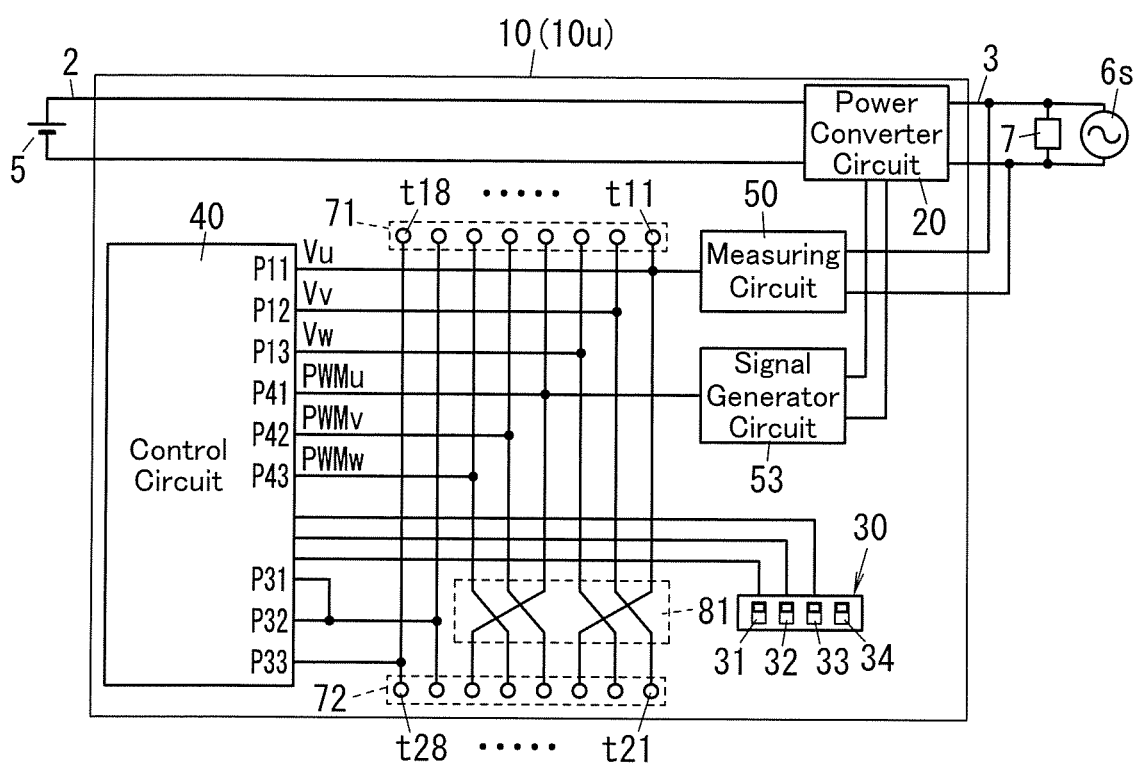
FIG. 11 is a circuit diagram illustrating a single-phase AC power conversion system that uses the power converter according to the fifth variation.

As shown in FIG. 10, each power converter 10 according to the fifth variation includes the measuring circuit 50, a signal generator circuit 53, the connection circuit 81, and connectors 71 and 72, which is a major difference from the power converter 10 according to the third variation. The power converter 10 according to the fifth variation is applicable to not only the power conversion system 1 for the single-phase alternating current source 6s as shown in FIG. 11, but also the power conversion system 1 for the three-phase alternating current sources 6u, 6v, and 6w as shown in FIG. 12. In the following description, any constituent element of this fifth variation, having the same function as a counterpart of the third variation described above, will be designated by the same reference numeral as that counterpart's, and description thereof will be omitted herein as appropriate.

The measuring circuit 50 measures a value representing an electrical characteristic of an alternating current source as a target of power conversion by the power converter circuit 20. For example, the measuring circuit 50 may measure the amount of alternating current as a value representing an electrical characteristic of the alternating current source as the target of power conversion.

The signal generator circuit 53 generates a PWM signal in response to a control signal PWMu supplied from the control circuit 40 and outputs the PWM signal to the power converter circuit 20. The power converter circuit 20 performs PWM control on a switching element in accordance with the PWM signal supplied from the signal generator circuit 53, thereby controlling the output of the power converter circuit 20.

The control circuit 40 includes input ports P11, P12, and P13 for receiving U-, V-, and W-phase measured values, respectively, and input/output ports P41, P42, and P43 for receiving or outputting U-, V-, and W-phase control signals PWMu, PWMv, and PWMw. The control circuit 40 further includes an output port P31 and input port P32 for outputting and receiving an error signal and an input/output port P33 for receiving and outputting a clock signal.

The connector 71 includes eight-pole connection terminals t11-t18, and the connector 72 includes eight-pole connection terminals t21-t28. As shown in FIG. 12, the connector 71 (with the connection terminals t11-t18) of the V-phase power converter 10v is electrically connected to the connector 72 (with the connection terminals t21-t28) of the U-phase power converter 10u via a plurality of (eight) signal lines of the signal bus 4. The connector 72 (with the connection terminals t21-t28) of the V-phase power converter 10v is electrically connected to the connector 71 (with the connection terminals t11-t18) of the W-phase power converter 10w via a plurality of (eight) signal lines of the signal bus 4. This allows the plurality of power converters 10u, 10v, and 10w to share multiple types of information through the plurality of signal lines of the signal bus 4.

The input ports P11, P12, and P13 of the control circuit 40 are respectively connected to the connection terminals t11, t12, and t13 of the connector 71. The input/output ports P41, P42, and P43 thereof are respectively connected to the connection terminals t14, t15, and t16 of the connector 71 (see FIG. 10). The output port P31 and the input port P32 are respectively connected to the connection terminals t17 and t27 of the connectors 71 and 72. The input/output port P33 is connected to the connection terminals t18 and t28 of the connectors 71 and 72.

In this variation, the arrangement pattern of the phases of the alternating current sources associated with the signals supplied to the input ports P11-P13 in each of the power converters 10u, 10v, and 10w is different from in any of the two other power converters 10, and the arrangement pattern of the phases of the alternating current sources associated with the signals received at, or output from, the input/output ports P41-P43 in each of the power converters 10u, 10v, and 10w is different from in any of the two other power converters 10. Specifically, the arrangement pattern of the alternating current source associated with the input port P11 and input/output port P41, the alternating current source associated with the input port P12 and the input/output port P42, and the alternating current source associated with the input port P13 and the input/output port P43 in one of the power converters 10u, 10v, and 10w is different from in any of the two other power converters 10u, 10v, and 10w. In other words, the wiring patterns of the plurality of connection terminals are different between two power converters (e.g., the power converters 10u and 10v) that are connected together adjacent to the signal bus 4, among the plurality of power converters 10u, 10v, and 10w.

Thus, each of the power converters 10u, 10v, and 10w is provided with the connection circuit 81 and the connection terminals t11-t16 of the connector 71 are respectively connected to the connection terminals t21-t26 of the connector 72 via the connection circuit 81.

The connection circuit 81 includes electrically conductive paths 81a for electrically connecting together some, associated with the same type of information out of multiple different types of information, of the plurality of connection terminals t11-t16 that each of the plurality of power converters 10u, 10v, and 10w has.

In this embodiment, the connection circuit 81 includes electrically conductive paths 81a for connecting the connection terminals t11, t12, and t13 to the connection terminal t23, t21, and t22, respectively. The connection circuit 81 further includes electrically conductive paths 81a for connecting the connection terminals t14, t15, and t16 to the connection terminal t26, t24, and t25, respectively. In this manner, the electrically conductive paths 81a are shuffled such that the signals supplied to the connection terminals t21-t26 of one of two adjacent power converters 10 agree with the signals supplied to the connection terminals t11-t16 of the other of the two adjacent power converters 10 (i.e., such that the types of information provided to these two groups of connection terminals match each other).

Figure 12:
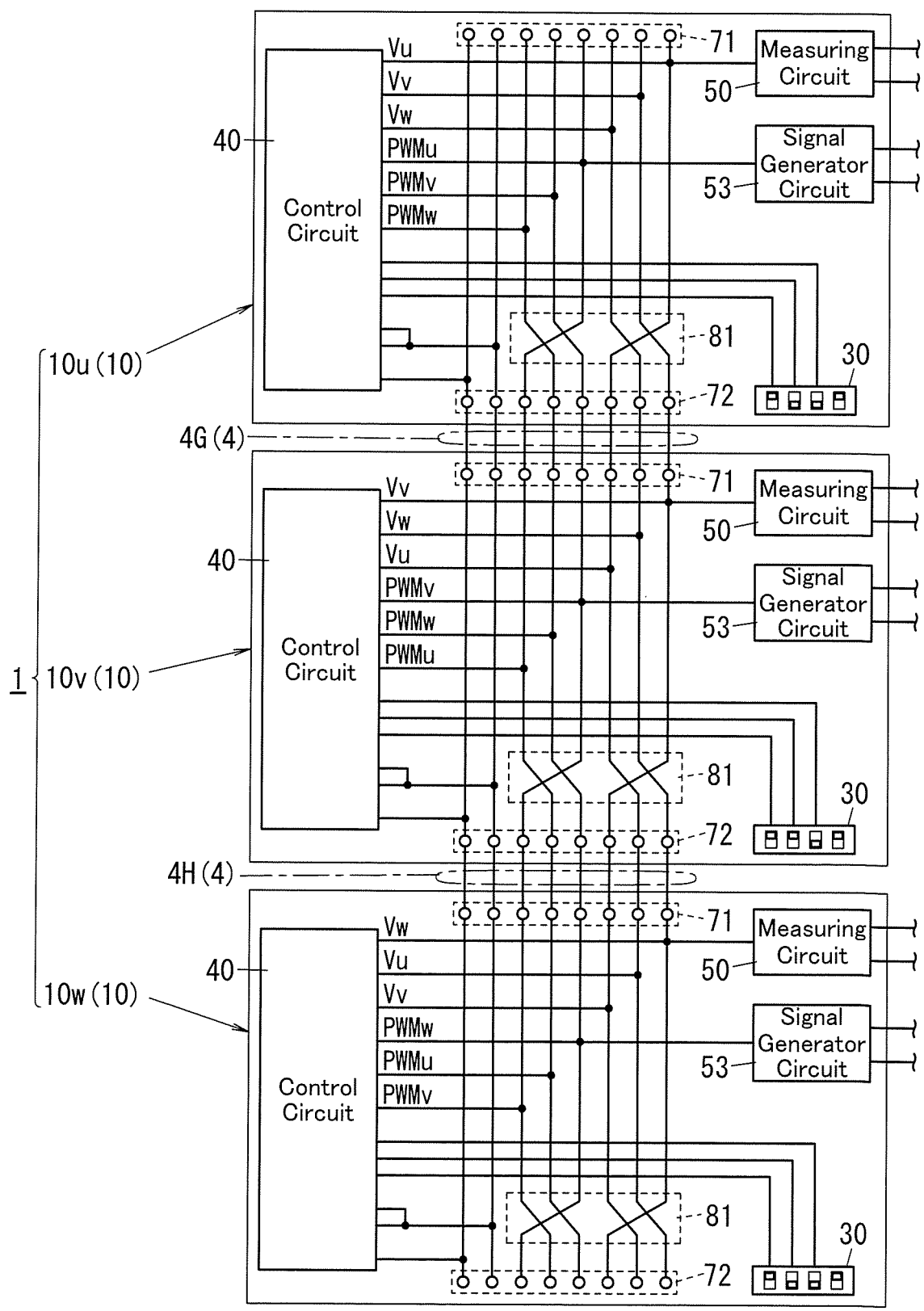
FIG. 12 is a circuit diagram illustrating a three-phase AC power conversion system that uses the power converters according to the fifth variation.
Figure 13:
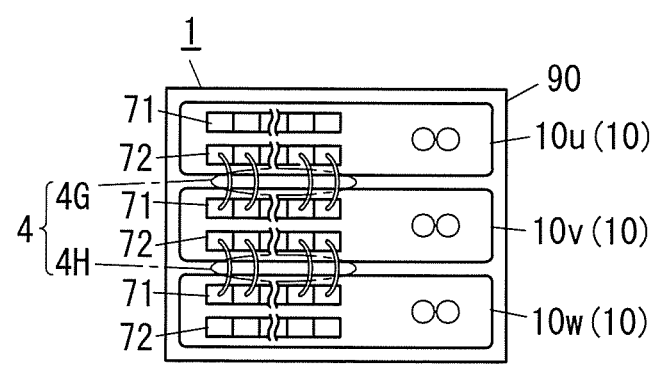
FIG. 13 is a front view illustrating a state where the power converter according to the fifth variation is housed in a housing rack.

As shown in FIGS. 12 and 13, in the three-phase AC power conversion system 1, the connectors 71 and 72 of the power converters 10u, 10v, and 10w of the three phases are connected together via harness 4G or 4H forming part of the signal bus 4. Specifically, the connector 72 of the U-phase power converter 10u and the connector 71 of the V-phase power converter 10v are connected together via the harness 4G. The connector 72 of the V-phase power converter 10v and the connector 71 of the W-phase power converter 10w are connected together via the harness 4H. In this case, these harnesses 4G and 4H, and internal electric wires of the power converters 10u, 10v, and 10w (including the connection circuits 81 thereof) together form the signal bus 4.

When the power converters 10u, 10v, and 10w are connected together via the harnesses 4G and 4H, some, transmitting associated signals (or information), of a plurality of signal lines that each harness 4G or 4H includes are connected to the connection terminals t11-t16 of the connector 71 of the power converters 10u, 10v, and 10w. This allows the power converters 10u, 10v, and 10w of the three phases to share multiple different types of information with each other.

Note that the connection circuit 81 (see FIGS. 9 and 10) described for the fifth variation is only an example. If necessary, the configuration of the electrically conductive paths 81a that the connection circuit 81 has may be changed as appropriate according to the number, arrangement, or any other parameter of the connection terminals that the plurality of power converters 10u, 10v, and 10w have.

Optionally, in the fifth variation, out of the three power converters 10u, 10v, and 10w, the V-phase power converter 10v, for example, may serve as a master device and may output control signals PWMu and PWMw to the U- and W-phase power converters 10u and 10w, respectively, serving as slave devices. In that case, in the U- and W-phase power converters 10u and 10w serving as slave devices, the control circuit 40 does not perform the processing of generating the control signals PWMu and PWMw.

The control circuit 40 of the V-phase power converter 10v generates, based on the measured values Vu, Vv, and Vw of the U-, V-, and W-phase AC voltages input through the signal bus 4, U-, V-, and W-phase control signals PWMu, PWMv, and PWMw, respectively. The control circuit 40 outputs the control signals PWMv, PWMw, and PWMu through the input/output ports P41, P42, and P43, respectively.

The V-phase control signal PWMv is input to the signal generator circuit 53. In response, the signal generator circuit 53 generates a PWM signal in accordance with the control signal PWMv, and outputs the PWM signal to the power converter circuit 20.

Meanwhile, the U- and W-phase control signals PWMu and PWMw are input to the signal generator circuits 53 of the power converters 10u and 10w, respectively, via the signal bus 4. The signal generator circuit 53 of the power converter 10u generates a PWM signal in accordance with the control signal PWMu supplied from the power converter 10v, and outputs the PWM signal to the power converter circuit 20. In the same way, the signal generator circuit 53 of the power converter 10w generates a PWM signal in accordance with the control signal PWMw supplied from the power converter 10v, and outputs the PWM signal to the power converter circuit 20.

This allows the control circuit 40 of the V-phase power converter 10v to control the output of the power converters 10u, 10v, and 10w of the three phases. Alternatively, the control circuit 40 of the U-phase power converter 10u or the control circuit 40 of the W-phase power converter 10w may generate the control signals PWMu, PWMv, and PWMw for the three phases. That is to say, the control circuit 40 of any one of the power converters 10u, 10v, and 10w of the three phases may generate the control signals PWMu, PWMv, and PWMw for the three phases.

(2.6) Sixth Variation

Figure 14:
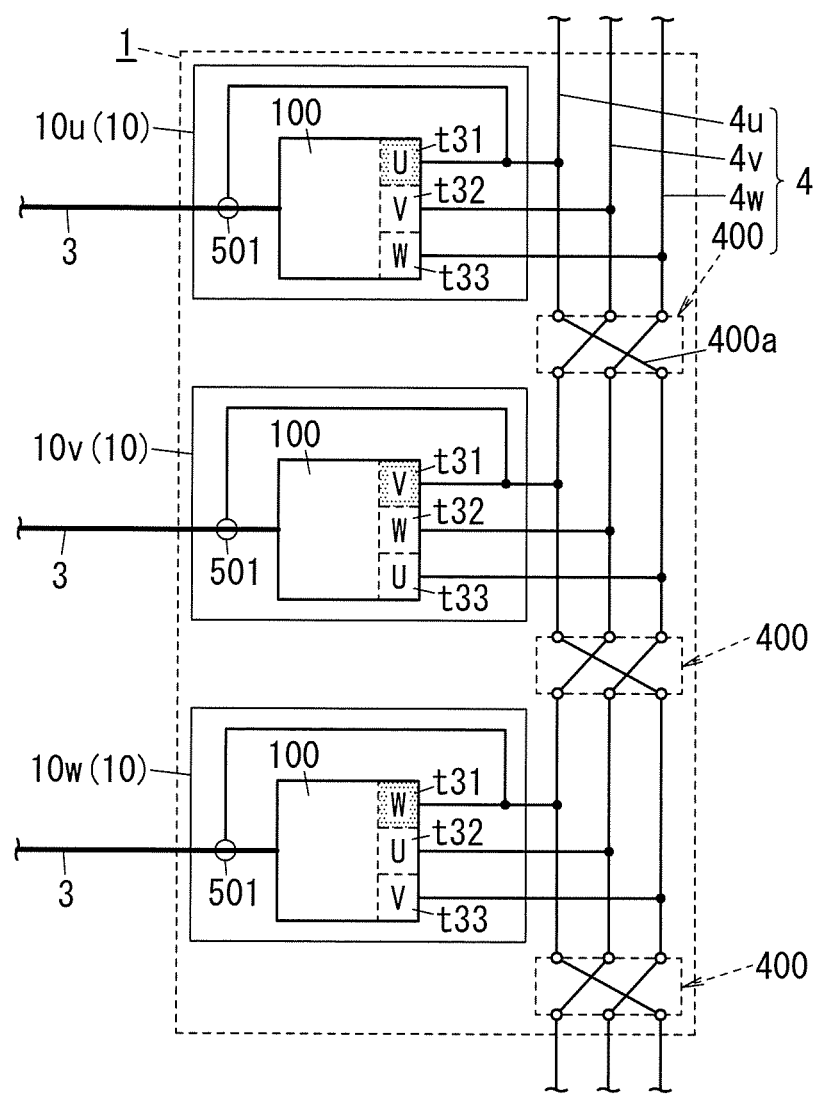
FIG. 14 is a circuit diagram illustrating a power conversion system according to a sixth variation of the exemplary embodiment of the present disclosure.

In the fifth variation described above, the connection circuit 81 is provided inside of the power converter 10u, 10v, or 10w of each phase. In contrast, in this sixth variation, a connection circuit 400 is provided in the middle of the signal bus 4 as shown in FIG. 14.

The connection circuit 400 is provided on the signal bus 4 so as to be located between two power converters 10 connected adjacent to the signal bus 4.

In each of the power converters 10u, 10v, and 10w of the respective phases, the connection terminals t31, t32, and t33 to be connected to the signal lines 4u, 4v, and 4w of the signal bus 4 are provided on the circuit board 100 on which the power converter circuit 20 and other circuits are integrated together. The connection terminals t31, t32, and t33 are provided at the same fixed positions in each of the power converters 10u, 10v, and 10w. However, the signal lines 4u, 4v, and 4w are connected in three different patterns to the three sets of connection terminals t31, t32, and t33 in the power converters 10u, 10v, and 10w. In other words, the power converters 10u, 10v, and 10w have respectively different wiring patterns at the three sets of connection terminals t31, t32, and t33.

In the power converter 10u, the connection terminal t31 is connected to the signal line 4u associated with the U-phase alternating current source 6u as the target of power conversion, the connection terminal t32 is connected to the signal line 4v associated with the V-phase alternating current source 6v, and the connection terminal t33 is connected to the signal line 4w associated with the W-phase alternating current source 6w.

In the power converter 10v, the connection terminal t31 is connected to the signal line 4v associated with the V-phase alternating current source 6v as the target of power conversion, the connection terminal t32 is connected to the signal line 4w associated with the W-phase alternating current source 6w, and the connection terminal t33 is connected to the signal line 4u associated with the U-phase alternating current source 6u.

In the power converter 10w, the connection terminal t31 is connected to the signal line 4w associated with the W-phase alternating current source 6w as the target of power conversion, the connection terminal t32 is connected to the signal line 4u associated with the U-phase alternating current source 6u, and the connection terminal t33 is connected to the signal line 4v associated with the V-phase alternating current source 6v.

As can be seen, in the power converters 10u, 10v, and 10w, the signal lines 4u, 4v, and 4w are connected in three different patterns to the connection terminals t31, t32, t33. Thus, the connection circuit 400 is provided on the signal bus 4 so as to be located between two adjacent power converters 10.

The connection circuit 400 connected between the power converters 10u and 10v changes the arrangement pattern of the signal lines 4u, 4v, and 4w such that the signal lines 4v, 4w, and 4u are respectively connected to the connection terminals t31, t32, and t33 of the power converter 10v. That is to say, the connection circuit 400 shuffles the signal lines 4u, 4v, and 4w arranged.

The connection circuit 400 connected between the power converters 10v and 10w changes the arrangement pattern of the signal lines 4u, 4v, 4w such that the signal lines 4w, 4u, 4v are respectively connected to the connection terminals t31, t32, and t33 of the power converter 10w.

In this manner, the connection circuit 400 provided between two adjacent power converters 10 changes the arrangement pattern of the signal lines. Thus, connecting each power converter 10 to a predetermined position allows the connection terminals t31, t32, and t33 to be automatically connected to signal lines of their associated alternating current phases. For example, when the connection terminals t31, t32, and t33 are insert-type connection terminals and the signal bus 4 is provided with female connectors to which the connection terminals t31, t32, and t33 are inserted and connected, the connection work may be done even more easily. The connection work is facilitated because attaching the power converter 10 to a predetermined position makes the connection terminals t31, t32, and t33 inserted and connected to the connectors provided for the signal lines 4u, 4v, and 4w of their associated alternating current phases. In addition, since the signal lines to be connected to the connection terminals t31, t32, and t33 are selected by the connection circuit 400, the power converter 10 just needs to be attached to a predetermined position. Furthermore, since there is no need for the installer to rotate the phases of the signal lines (i.e., change the arrangement of the signal lines), the connection work is facilitated. In other words, the three electrically conductive paths 400a of the connection circuit 400 are configured to rotate the phases of the three signal lines 4u, 4v, and 4w of the U, V, and W phases that form the signal bus 4 (i.e., rotate the phases such that each of the three signal lines 4u, 4v, and 4w of the U, V, and W phases is arranged to be shifted by one phase from each of the two other signal lines). Thus, the connection circuit's 400 rotating the phases of the three signal lines 4u, 4v, and 4w of the U, V, and W phases allows AC signal lines of associated phases to be connected to the connection terminals t31, t32, and t33 of the power converters 10u, 10v, and 10w. That is to say, the connection circuit 400 rotates the phases (changes the arrangement) of the signal lines 4u, 4v, and 4w such that AC signal lines of associated phases are connected to the connection terminals t31, t32, and t33 of the power converters 10u, 10v, and 10w. This allows the connection terminals t31, t32, and t33, to which the signal lines 4u, 4v, and 4w need to be connected, to be changed in each of the power converters 10u, 10v, and 10w.

(2.7) Other Variations

The power conversion system 1 is connected to the three-phase AC power grid 6. However, this is only an example and should not be construed as limiting. Alternatively, the power grid 6 may also be a multi-phase AC power grid of two, four, or more phases.

The DC power supply 5 implemented as a storage battery is connected to the power converter circuit 20. However, the DC power supply 5 does not have to be a storage battery but may also be a power generator such as a solar power generator, a wind power generator, or a fuel cell. Optionally, an AC power supply may be connected via an electric wire 2 to the power converter circuit 20. In that case, the power converter circuit 20 may perform power conversion between AC power supplied from the AC power supply and AC power supplied from any of the alternating current sources 6u, 6v, and 6w for the three-phase AC power conversion system 1.

The setting unit 30 does not have to be a DIP switch, but may also be implemented as a programmable device such as a microcomputer. Optionally, the setting unit 30 and the control circuit 40 may be implemented as the same microcomputer. Alternatively, the setting unit 30 may have the communications capability of communicating with an external setting unit, and may select, in accordance with the setting information received from the external setting unit, an alternating current source as a target of power conversion by the power converter circuit 20.

Optionally, the function of at least one component selected from the group consisting of the power converter circuit 20, the setting unit 30, and control circuit 40 included in the power converter 10 may be distributed in two or more devices. Alternatively, the function of each of the power converter circuit 20, the setting unit 30, and the control circuit 40 may be distributed in multiple devices. The function to be performed by the control circuit 40 may be implemented as a cloud computing system, for example.

(Resume)

As can be seen from the foregoing description, a power converter (10, 10u, 10v, 10w) according to a first aspect is designed for use as one of a plurality of power converters (10, 10u, 10v, 10w) that form parts of a power conversion system (1). Each of the plurality of power converters (10, 10u, 10v, 10w) is configured to perform power conversion on AC power. The power conversion system (1) includes the plurality of power converters for performing conversion on AC power and is connected to a power grid (6) of multi-phase power that is a combination of multiple alternating current sources (6u, 6v, 6w) with mutually different phases. Each of the plurality of power converters (10, 10u, 10v, 10w) includes a power converter circuit (20), a setting unit (30), and a control circuit (40). The power converter circuit (20) performs power conversion between either DC power or AC power and AC power supplied from any of the multiple alternating current sources (6u, 6v, 6w). The setting unit (30) selects one of the multiple alternating current sources (6u, 6v, 6w) as a target of the power conversion to be performed by the power converter circuit (20). The control circuit (40) controls operation of the power converter circuit (20) in accordance with selection made by the setting unit (30).

This allows the setting unit (30) to select one of the multiple alternating current sources (6u, 6v, 6w) as a target of the power conversion to be performed by the power converter circuit (20). This means that the power converter (10, 10u, 10v, 10w) may be used as a power converter for any desired alternating current source (6u, 6v, 6w), thus enabling only a power converter (10, 10u, 10v, 10w) with a failure to be replaced and thereby ensuring improved installability.

In a power converter (10, 10u, 10v, 10w) according to a second aspect, which may be implemented in conjunction with the first aspect, the control circuit (40) shares information with the rest of the plurality of power converters (10, 10u, 10v, 10w), other than the power converter (10, 10u, 10v, 10w) of its own, to control the operation of the power converter circuit (20) of its own in accordance with the information.

This allows the control circuit (40) to control the operation of the power converter circuit (20) of its own in accordance with the information shared with the rest of the power converters (10, 10u, 10v, 10w) other than its own, thus enabling the plurality of power converters (10, 10u, 10v, 10w) to operate in conjunction with each other.

In a power converter (10, 10u, 10v, 10w) according to a third aspect, which may be implemented in conjunction with the second aspect, the information includes values measured by a plurality of measuring circuits (50, 51, 52). Each of the plurality of measuring circuits (50, 51, 52) measures a value representing an electrical characteristic of an associated one of the multiple alternating current sources (6u, 6v, 6w). The control circuit (40) controls the power converter circuit (20) in accordance with the values measured by the plurality of measuring circuits (50, 51, 52).

This allows the control circuit (40) to control the power converter circuit (20) in accordance with the values measured by the plurality of measuring circuits (50, 51, 52), thus enabling the plurality of power converters (10, 10u, 10v, 10w) to operate in conjunction with each other.

In a power converter (10, 10u, 10v, 10w) according to a fourth aspect, which may be implemented in conjunction with the third aspect, a signal bus (4) including a plurality of signal lines (4u, 4v, 4w) is electrically connected to each of the plurality of power converters (10, 10u, 10v, 10w). Each of the plurality of measuring circuits (50, 51, 52) outputs the measured value to an associated one of the plurality of signal lines (4u, 4v, 4w).

This allows the control circuit (40) to share the values measured by the plurality of measuring circuits (50, 51, 52) through the signal bus (4), thus enabling the plurality of power converters (10, 10u, 10v, 10w) to operate in conjunction with each other.

In a power converter (10, 10u, 10v, 10w) according to a fifth aspect, which may be implemented in conjunction with any one of the second to fourth aspects, the information includes a clock signal for synchronizing operations of the plurality of power converters (10, 10u, 10v, 10w) with each other.

This allows the plurality of power converters (10, 10u, 10v, 10w) to operate responsive to the same clock signal, thus reducing the chances of causing a time lag in operation between the plurality of power converters (10, 10u, 10v, 10w).

In a power converter (10, 10u, 10v, 10w) according to a sixth aspect, which may be implemented in conjunction with any one of the first to fifth aspects, one of the plurality of power converters (10, 10u, 10v, 10w) serves as a master device and the rest of the plurality of power converters (10, 10u, 10v, 10w), other than the power converter (10, 10u, 10v, 10w) serving as the master device, serves as one slave device or a plurality of slave devices. When the power converter (10, 10u, 10v, 10w) of its own serves as the master device, the control circuit (40) suspends the operation of the power converter circuit (20) and outputs a suspend instruction to the one slave device or the plurality of slave devices on detecting an error. Alternatively, when the power converter (10, 10u, 10v, 10w) of its own serves as the one slave device or one of the plurality of slave devices, the control circuit (40) suspends the operation of the power converter circuit (20) on receiving the suspend instruction from the master device.

This allows the plurality of power converters (10, 10u, 10v, 10w), serving as slave devices, to suspend their operation at a time on receiving the suspend instruction from the master device.

In a power converter (10, 10u, 10v, 10w) according to a seventh aspect, which may be implemented in conjunction with any one of the first to sixth aspects, one of the plurality of power converters (10, 10u, 10v, 10w) serves as a master device and the rest of the plurality of power converters (10, 10u, 10v, 10w), other than the power converter (10, 10u, 10v, 10w) serving as the master device, serves as one slave device or a plurality of slave devices. When the power converter (10, 10u, 10v, 10w) of its own serves as the master device, the control circuit (40) outputs a control signal to the one slave device or the plurality of slave devices. Alternatively, when the power converter (10, 10u, 10v, 10w) of its own serves as the one slave device or one of the plurality of slave devices, the power converter circuit (20) has its operation controlled in accordance with the control signal supplied from the master device.

This allows the control circuit (40) of the master device to control the operation of the respective power converter circuits (20) of the plurality of power converters (10, 10u, 10v, 10w).

A power conversion system (1) according to an eighth aspect includes: a plurality of the power converters (10, 10u, 10v, 10w) of any one of the first to seventh aspects; and a signal bus (4) electrically connected to each of the plurality of the power converters (10, 10u, 10v, 10w). The signal bus (4) includes a plurality of signal lines (4u, 4v, 4w) respectively associated with multiple types of information to be shared by the plurality of the power converters (10, 10u, 10v, 10w).

This provides a power conversion system (1) with improved installability.

In a power conversion system (1) according to a ninth aspect, which may be implemented in conjunction with the eighth aspect, each of the plurality of the power converters (10, 10u, 10v, 10w) includes a plurality of connection terminals (t11-t18, t21-t28, t31-t33) to be electrically connected to the plurality of signal lines (4u, 4v, 4w). The power conversion system (1) further includes a connection circuit (81, 400) with a plurality of electrically conductive paths (81a, 400a). Each of the electrically conductive paths (81a, 400a) electrically connects together ones, associated with the same type of information out of the multiple types of information, of the plurality of connection terminals (t11-t18, t21-t28, t31-t33) that each of the plurality of power converters (10, 10u, 10v, 10w) has.

This allows, when the plurality of power converters (10, 10u, 10v, 10w) are connected to the signal bus (4), the connection terminals (t11-t18, t21-t28, t31-t33) to be connected to their associated signal lines (4u, 4v, 4w).

In a power conversion system (1) according to a tenth aspect, which may be implemented in conjunction with the ninth aspect, the connection circuit (400) is provided on the signal bus (4) so as to be located between two power converters (10, 10u, 10v, 10w) that are connected adjacent to the signal bus (4).

This allows, when the plurality of power converters (10, 10u, 10v, 10w) are connected to the signal bus (4), the connection terminals (t11-t18, t21-t28, t31-t33) to be connected to their associated signal lines (4u, 4v, 4w).

A power conversion system (1) according to an eleventh aspect, which may be implemented in conjunction with the ninth or tenth aspect, further includes a storage battery (5). The power converter circuit (20) performs power conversion between DC power supplied from the storage battery (5) and AC power supplied from any one of the multiple alternating current sources (6u, 6v, 6w).

This allows the power conversion system (1) to perform at least one of the operation of converting DC power discharged from the storage battery (5) into AC power and supplying the AC power or the operation of converting the AC power supplied from any of the alternating current sources (6u, 6v, 6w) into DC power and charging the storage battery (5) with the DC power.

A power conversion system (1) according to a twelfth aspect, which may be implemented in conjunction with any one of the ninth to eleventh aspects, further includes a housing (90) to house the plurality of the power converters (10, 10u, 10v, 10w) and the signal bus (4).

Note that the constituent elements according to the second to seventh aspects are not essential elements of the power converter (10, 10u, 10v, 10w) but may be omitted as appropriate and that the constituent elements according to the ninth to twelfth aspects are not essential elements of the power conversion system (1) but may be omitted as appropriate.

REFERENCE SIGNS LIST

1 Power Conversion System
4 Signal Bus
5 DC Power Supply (Storage Battery)
4u, 4v, 4w Signal Line
6 Power Grid
6u, 6v, 6w Alternating Current Source
10, 10u, 10v, 10w Power Converter
20 Power Converter Circuit
30 Setting Unit
40 Control Circuit
50 Measuring Circuit
51 First Measuring Circuit (Measuring Circuit)
52 Second Measuring Circuit (Measuring Circuit)
81, 400 Connection Circuit
90 Housing Rack (Housing)
t11-t18, t21-t28, t31-t33 Connection Terminal

The invention claimed is:

1. A power converter for use as one of a plurality of power converters that form parts of a power conversion system, each of the plurality of power converters being configured to perform power conversion on AC power, the power conversion system being connected to a power grid of multi-phase power that is a combination of multiple alternating current sources with mutually different phases, the power converter comprising:

a power converter circuit configured to perform power conversion between either DC power or AC power and AC power supplied from any of the multiple alternating current sources;

a setting unit configured to select one of the multiple alternating current sources as a target of the power conversion to be performed by the power converter circuit; and a control circuit configured to control operation of the power converter circuit in accordance with selection made by the setting unit, wherein one of the plurality of power converters serves as a master device and the rest of the plurality of power converters, other than the power converter serving as the master device, serves as one slave device or a plurality of slave devices, and the control circuit is configured to, when the power converter serves as the master device, suspend the operation of the power converter circuit and output a suspend instruction to the one slave device or the plurality of slave devices based on detecting an error, or when the power converter serves as either the one slave device or one of the plurality of slave devices, suspend the operation of the power converter circuit based on receiving the suspend instruction from the master device.

2. The power converter of claim 1, wherein
the control circuit is configured to share information with the rest of the plurality of power converters, other than the power converter, to control the operation of the power converter circuit in accordance with the information.

3. The power converter of claim 2, wherein
the information includes values measured by a plurality of measuring circuits, each of the plurality of measuring circuits being configured to measure a value representing an electrical characteristic of an associated one of the multiple alternating current sources, and the control circuit is configured to control the power converter circuit in accordance with the values measured by the plurality of measuring circuits.

4. The power converter of claim 3, wherein
a signal bus including a plurality of signal lines is electrically connected to each of the plurality of power converters, and each of the plurality of measuring circuits is configured to output the measured value to an associated one of the plurality of signal lines.

5. The power converter of claim 4, wherein
the information includes a clock signal for synchronizing operations of the plurality of power converters with each other.

6. The power converter of claim 3, wherein
the information includes a clock signal for synchronizing operations of the plurality of power converters with each other.

7. The power converter of claim 2, wherein
the information includes a clock signal for synchronizing operations of the plurality of power converters with each other.

8. The power converter of claim 2, wherein
the control circuit is configured to, when the power converter serves as the master device, output a control signal to the one slave device or the plurality of slave devices, and the control circuit is configured to, when the power converter serves as the one slave device or one of the plurality of slave devices, control the operation of the power converter circuit in accordance with the control signal supplied from the master device.

9. The power converter of claim 1, wherein
the control circuit is configured to, when the power converter serves as the master device, output a control signal to the one slave device or the plurality of slave devices, and the control circuit is configured to, when the power converter serves as the one slave device or one of the plurality of slave devices, control the operation of the power converter circuit in accordance with the control signal supplied from the master device.

10. A power converter for use as one of a plurality of power converters that form parts of a power conversion system, each of the plurality of power converters being configured to perform power conversion on AC power, the power conversion system being connected to a power grid of multi-phase power that is a combination of multiple alternating current sources with mutually different phases, the power converter comprising:

a power converter circuit configured to perform power conversion between either DC power or AC power and AC power supplied from any of the multiple alternating current sources;

a setting unit configured to select one of the multiple alternating current sources as a target of the power conversion to be performed by the power converter circuit; and a control circuit configured to control operation of the power converter circuit in accordance with selection made by the setting unit, wherein one of the plurality of power converters serves as a master device and the rest of the plurality of power converters, other than the power converter serving as the master device, serves as one slave device or a plurality of slave devices, the control circuit is configured to, when the power converter serves as the master device, output a control signal to the one slave device or the plurality of slave devices, and the control circuit is configured to, when the power converter serves as the one slave device or one of the plurality of slave devices, control the operation of the power converter circuit in accordance with the control signal supplied from the master device.

11. A power conversion system comprising:
a plurality of power converters; and
a signal bus electrically connected to each of the plurality of the power converters, each of the plurality of power converters being configured to perform power conversion on AC power, the power conversion system being connected to a power grid of multi-phase power that is a combination of multiple alternating current sources with mutually different phases, a power converter for use as one of the plurality of power converters comprising:

a power converter circuit configured to perform power conversion between either DC power or AC power and AC power supplied from any of the multiple alternating current sources;

a setting unit configured to select one of the multiple alternating current sources as a target of the power conversion to be performed by the power converter circuit; and a control circuit configured to control operation of the power converter circuit in accordance with selection made by the setting unit, the signal bus including a plurality of signal lines respectively associated with multiple types of information to be shared by the plurality of the power converters, wherein the power converter for use as one of the plurality of the power converters includes a plurality of connection terminals, the plurality of connection terminals are respectively associated with the multiple types of information, and the power conversion system further includes a connection circuit with a plurality of electrically conductive paths, each of the plurality of electrically conductive paths being configured to electrically connect together one connection terminal of the plurality of connection terminals and one signal line of the plurality of signal lines, the one connection terminal and the one signal line being associated with the same type of information out of the multiple types of information.

12. The power conversion system of claim 11, wherein the connection circuit is provided on the signal bus so as to be located between two power converters of the plurality of the power converters that are connected adjacent to the signal bus.

13. The power conversion system of claim 11, further comprising a storage battery, wherein
the power converter circuit is configured to perform power conversion between DC power supplied from the storage battery and AC power supplied from any one of the multiple alternating current sources.

14. The power conversion system of claim 11, further comprising a housing configured to house the plurality of the power converters and the signal bus.

* * * * *